United States Patent
Brevick et al.

(10) Patent No.: US 7,255,095 B1
(45) Date of Patent: Aug. 14, 2007

(54) DUAL COMBUSTION MODE ENGINE

(75) Inventors: John Brevick, Livonia, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 11/276,217

(22) Filed: Feb. 17, 2006

(51) Int. Cl.
*E02M 25/07* (2006.01)
*F02B 47/08* (2006.01)
*F02N 5/02* (2006.01)
*G06F 17/00* (2006.01)

(52) U.S. Cl. .................. 123/568.11; 60/320; 60/605.2; 123/568.2; 701/108

(58) Field of Classification Search ............ 123/568.11, 123/568.12, 568.13, 568.2, 568.21, 568.23, 123/568.24, 568.25, 568.26, 568.27, 568.28, 123/568.29, 568.3, 198 F, 481; 60/320, 321, 60/323, 605.2; 701/108
See application file for complete search history.

(56) References Cited

U.S. PATENT DOCUMENTS

| | | | |
|---|---|---|---|
| 3,941,113 A | | 3/1976 | Baguelin |
| 4,192,278 A | * | 3/1980 | Iizuka et al. ............. 123/198 F |
| 4,303,053 A | | 12/1981 | Etoh et al. |
| 4,344,393 A | * | 8/1982 | Etoh et al. ............... 123/198 F |
| 6,390,054 B1 | * | 5/2002 | Yang ......................... 123/295 |
| 6,401,699 B1 | * | 6/2002 | Persson et al. ........ 123/568.12 |
| 7,080,635 B2 | * | 7/2006 | Sato ....................... 123/568.2 |
| 7,104,048 B2 | * | 9/2006 | Brown ....................... 60/286 |
| 2004/0182359 A1 | | 9/2004 | Stewart et al. |

FOREIGN PATENT DOCUMENTS

| | | |
|---|---|---|
| DE | 4421258 A1 | 6/1994 |
| DE | 4421258 A | 12/1995 |
| DE | 19500761 A | 7/1996 |
| EP | 1830388 A1 | 3/2006 |
| JP | 09-112256 | 4/1997 |
| JP | 09112256 A | 4/1997 |
| JP | 2005-054710 | 3/2005 |
| JP | 2005054710 A | 3/2005 |
| WO | WO2006032886 A | 3/2006 |
| WO | WO 2006032886 A | 3/2006 |

* cited by examiner

*Primary Examiner*—Willis R. Wolfe, Jr.
(74) *Attorney, Agent, or Firm*—Diana D. Brehob

(57) ABSTRACT

In an engine in which a first portion of engine cylinders operate in HCCI combustion mode only and a second portion of engine cylinders operate in SI combustion mode only, two EGR ducts and valves are provided: a first EGR duct adapted to provide flow from an exhaust of HCCI engine cylinders to an intake of HCCI cylinders; a first EGR valve disposed in the first EGR duct; a second EGR duct adapted to provide flow from an exhaust of SI cylinders to an intake of HCCI cylinders via a first EGR valve; and a second EGR valve disposed in the second EGR duct. By adjusting the EGR valves, the intake temperature to HCCI cylinders is controlled. During cold start, the second EGR valve is opened to pull SI exhaust through HCCI cylinders for the purpose of preheating HCCI cylinders.

21 Claims, 5 Drawing Sheets

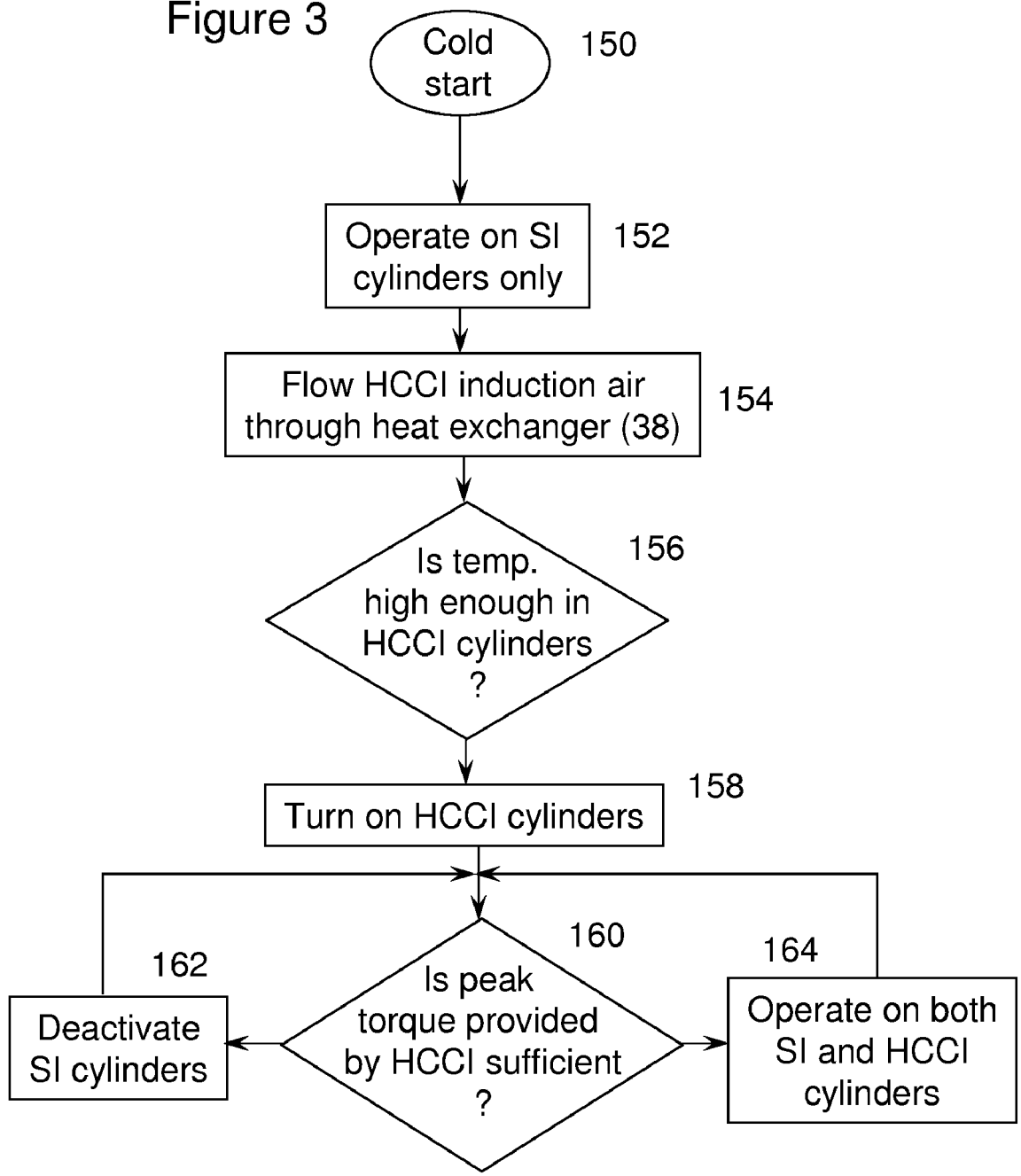

DUAL COMBUSTION MODE ENGINE

FIELD OF INVENTION

The present invention relates to an internal combustion engine in which a portion of cylinders exclusively operate under a spark-ignition combustion mode and remaining cylinders exclusively operate under a homogeneous-charge, compression-ignition mode.

BACKGROUND OF THE INVENTION

Homogeneous-charge, compression-ignition combustion is known to those skilled in the art to provide high fuel efficiency and low emission operation in internal combustion engines. However, HCCI operation is feasible in a narrow range in engine torque, approximately one-third of the torque range of a conventional spark-ignited engine. Thus, most HCCI engines being developed are dual mode engines in which HCCI is used at low torque conditions. When a higher torque is desired, operation is transitioned to an alternative combustion mode, such as spark-ignition combustion or heterogeneous, compression-ignition combustion (diesel). Challenges accompanying such transitions include: torque matching (providing driver demanded torque during the transition interval), maintaining emission control, and robustly returning to HCCI combustion, to name a few. Another difficulty encountered in engines which transition from one combustion mode to another is that the combustion system geometry cannot be optimized for either combustion mode, but is instead a compromise. For example, a desirable compression ratio for HCCI combustion is about 15:1 and about 10.5:1 for spark-ignition combustion.

A disadvantage of HCCI combustion is its inferior transient response to a demand for a change in torque, orders of magnitude slower than SI combustion. The inventors of the present invention have recognized that HCCI operation cannot provide a vehicle operator with the responsiveness that they have come to expect from a SI engine.

In U.S. patent application 2004/0182359, an 8-cylinder HCCI/SI engine is described in which HCCI to SI transitions are made one cylinder at a time, i.e., at a lower torque demand all 8 cylinders are operating in HCCI combustion mode and as torque demand exceeds what HCCI combustion can provide, cylinders are individually switched to SI operation. The inventors of the present invention have recognized that it would be desirable to have an engine which provides the desired range in output torque at the high efficiency of HCCI combustion without having to undergo a combustion mode transition in any given cylinder because of the compromises inherent in designing a cylinder to operate robustly and efficiently in both HCCI and SI combustion modes over a wide operating range.

SUMMARY OF THE INVENTION

In an engine in which a first portion of engine cylinders operate in HCCI combustion mode only and a second portion of engine cylinders operate in SI combustion mode only, two exhaust gas recirculation ducts and valves are provided: a first exhaust gas recirculation duct adapted to provide flow from an exhaust of the first portion of engine cylinders to an intake of the first portion of engine cylinders; a first exhaust gas recirculation valve disposed in the first exhaust gas recirculation duct; a second exhaust gas recirculation duct adapted to provide flow from an exhaust of the second portion of engine cylinders to an intake of the first portion of engine cylinders via a first exhaust gas recirculation valve; and a second exhaust gas recirculation valve disposed in the second exhaust gas recirculation duct. An electronic control unit coupled to the first and second portions of engine cylinders and the first and second exhaust gas recirculation valves commands a first position to the first exhaust gas recirculation valve and a second position to the second exhaust gas recirculation valve based on a desired intake temperature. Alternatively, the electronic control unit coupled to the first and second portions of engine cylinders and the first and second exhaust gas recirculation valves commands a first position to the first exhaust gas recirculation valve and a second position to the second exhaust gas recirculation valve based on a signal from a combustion sensor. Feedback control of valve position can be based on crank angle of peak pressure in the first portion of engine cylinders.

The first and second portions of engine cylinders are mutually exclusive, have separated intakes and exhausts and have different compression ratios, at least 2 ratios higher for the HCCI cylinders.

In one embodiment, the first portion of engine cylinders is greater than the second portion of engine cylinders. Further, the first portion of engine cylinders may comprise all but one cylinder on each bank of cylinders of the engine.

Also disclosed is a method for controlling an internal combustion engine, in which a valve position of a crossover exhaust gas recirculation valve is adjusted. The crossover exhaust gas recirculation valve is disposed in an exhaust gas recirculation duct between an intake of a first portion of engine cylinders (HCCI) and an exhaust of a second portion of engine cylinders (SI). The method further includes adjusting a valve position of a second exhaust gas recirculation valve which is disposed in an exhaust gas recirculation duct between an exhaust of the first portion of engine cylinders and the intake of the first portion of engine cylinders. In one embodiment, the adjustments are based on a desired intake temperature of gases provided to the first portion of engine cylinders. In another embodiment, valve adjustments are based on a signal from a combustion sensor. Feedback control of combustion parameters, EGR valve positions being one example, can be based on providing a desired crank angle of peak pressure from the combustion sensor, the desired crank angle of peak pressure in a range of 5 to 20 after top center of the piston.

The crossover EGR valve is open fully during starting of the engine during which time fuel is provided to the SI cylinders and no fuel to the HCCI cylinders. This provides the advantage of preheating HCCI cylinders in preparation for initiation of combustion therein.

An advantage of the present method is that control of the EGR valves can be feedback controlled on combustion in the HCCI cylinder. By doing this, efficient HCCI combustion is ensured.

A further advantage is that by providing two controllable exhaust gas streams of different temperatures to the intake of HCCI cylinders, intake temperature to HCCI cylinders can be controlled. Intake temperature is a key factor in controlling ignition timing with HCCI combustion.

BRIEF DESCRIPTION OF THE DRAWINGS

The advantages described herein will be more fully understood by reading an example of an embodiment in which the invention is used to advantage, referred to herein as the Detailed Description, with reference to the drawings wherein:

FIG. 3 is a flowchart of a cold start strategy;

DETAILED DESCRIPTION

Figure 1:
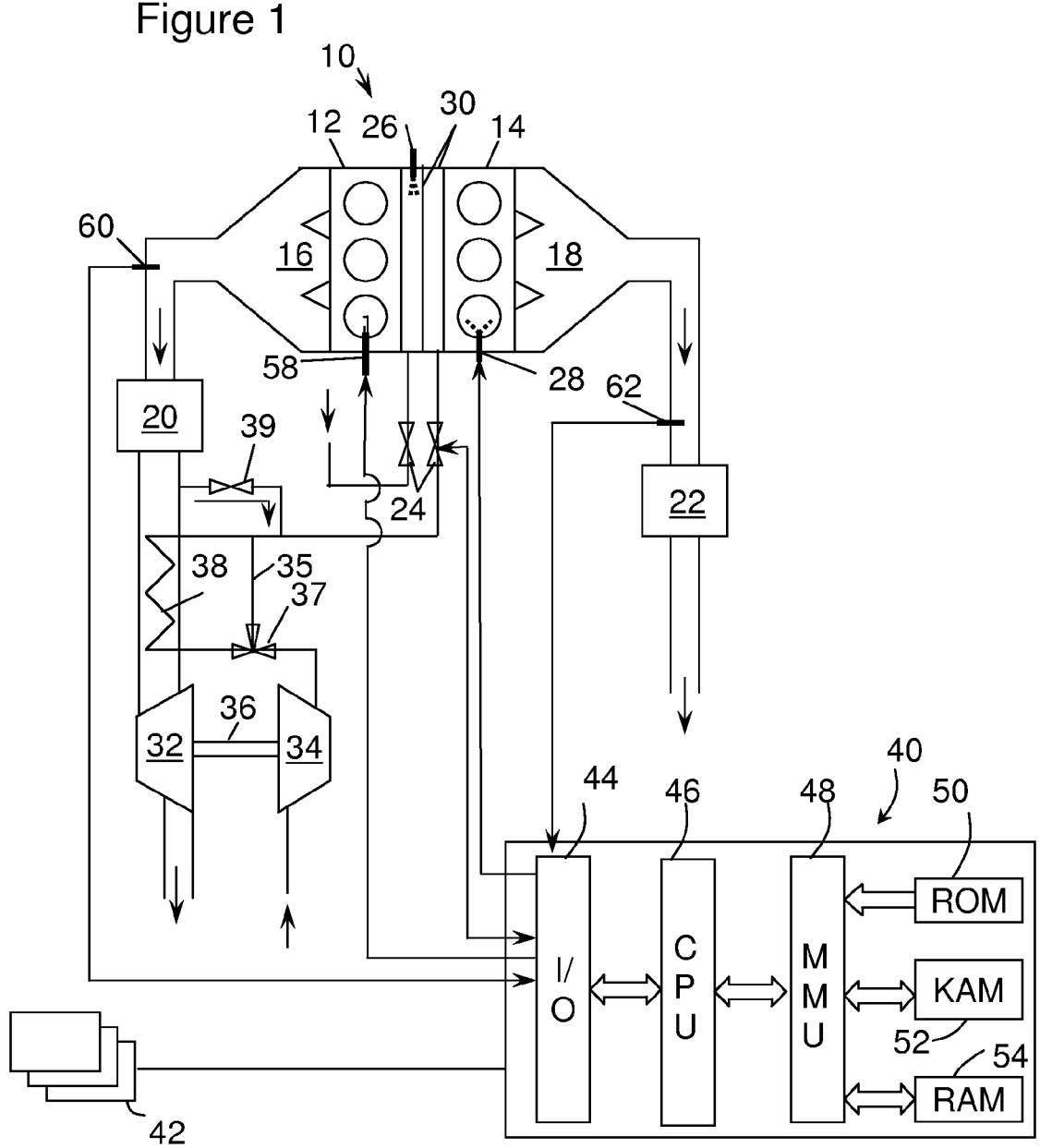
FIG. 1 is a schematic of an internal combustion engine according to an aspect of the present invention.

In FIG. 1, a multi-cylinder internal combustion engine 10 is shown. By way of example, engine 10 is shown to have six cylinders, two banks of 3 cylinders each. One bank of cylinders 12 is adapted to operate in a conventional spark-ignition (SI) mode. The other bank of cylinders 14 is adapted to operate in a homogeneous-charge, compression-ignition (HCCI) mode. Combustion air is provided to the cylinder banks via an intake manifold 30, which is separated such that air for cylinder bank 12 does not mix with air for cylinder bank 14. Each bank is provided with a throttle valve 24, or other means to control flow. SI combustion characteristically occurs at stoichiometric proportions of air and fuel, meaning that if combustion were complete, all the fuel and oxygen would be completely combusted to $H_2O$ and $CO_2$. To control the amount of torque produced in SI combustion, the amount of air is controlled by throttle valve 24. The amount of fuel added to the air, via injector 26, is metered to provide a stoichiometric mixture. For clarity, only one fuel injector 26 is shown in FIG. 1 for the 3 cylinders of bank 12. However, each cylinder is provided a fuel injector. Similarly, each cylinder in bank 14 is provided with a fuel injector like fuel injector 28. In FIG. 1, bank 12 is shown with a port injector in which fuel is sprayed outside of the cylinder and is brought into the cylinder with the combustion air and bank 14 is shown with a direct fuel injector in which fuel is sprayed directly into the combustion air which has been inducted into the cylinder. These types of fuel injection systems are shown by way of example. Both banks could be provided with port injection or both with direct injection according to the present invention. I.e., both HCCI and SI combustion can be accomplished with port, direct, or a combination of port and direct injection. Alternatively, fuel is provided by central body injection for either combustion mode.

Again, for clarity, only one of the three spark plugs for each of the cylinders of bank 12 is shown. Bank 14 cylinders may also have spark plugs. Although the bank 14 cylinders are HCCI cylinders, which indicates that combustion is initiated by compression ignition, it is known to those skilled in the art that at some operating conditions, it is useful to employ spark assist to initiate combustion. Alternatively, another ignition assist device such as glow plugs, plasma jet igniters, catalytic assisted glow plugs, as examples, could be used for ignition assist in HCCI. In SI combustion, a spark initiates a flame kernel and a flame front travels throughout the cylinder. In spark assisted HCCI, a spark initiates a flame kernel at the location of the spark plug. However, the mixture in the cylinder is too weak (not enough fuel or too much burned gases in the mixture) to sustain a flame front traveling through the cylinder gases. The flame kernel combusts the fuel-air mixture near the spark plug. The release of energy by the combustion of the mixture near the spark plug increases the pressure in the cylinder thereby causing the gases away from the spark plug to attain their ignition temperature and to self-ignite. When spark assist HCCI is contemplated, all HCCI cylinders are provided with a spark plug 58.

Engine 10 is shown to be a 6-cylinder with bank 12 being SI and bank 14 being HCCI by way of example. This is not intended to be limiting. Engine 10 has any number of cylinders greater than one and in any configuration: in-line, V, W, radial, opposed, or any other cylinder arrangement. The HCCI and SI cylinders need not be segregated by banks. There could be HCCI and SI cylinders on any given bank. However, as mentioned above, the intake gases to the HCCI cylinders and SI cylinders remain separated and exhaust gases coming from HCCI cylinders and SI cylinders also remain separated. Thus, such arrangements may require complicated manifolding to maintain the separation. An expected arrangement is that every other cylinder in the firing order is alternately HCCI and SI.

SI engines are typically produced with a 9.5-10.5:1 compression ratio, which is the ratio of the volume in the cylinder above the piston when the piston is at the top of its travel divided by the volume in the cylinder above the piston when the piston is at the bottom of its travel. HCCI combustion occurs more favorably with a higher compression ratio: 13-15:1. In prior art engines in which combustion mode is transitioned, the compression ratio selected is a compromise between the two compression ratios. According to the present invention, however, because each cylinder is optimized for a single combustion mode, the engine is produced with the compression ratio appropriate for the particular combustion mode. Thus, unlike prior art engines, the engine according to the present invention has some cylinders with a substantially higher compression ratio than other cylinders.

HCCI combustion occurs in a dilute mixture, either very lean of stoichiometric with excess air and/or with a very high level of exhaust dilution. It is well known to those skilled in the art to provide exhaust dilution by either recirculating exhaust gases into the engine intake, known as exhaust gas recirculation (EGR) sometimes referred to as external EGR, or to retain exhaust gases in the cylinder from a prior combustion event to mix with the combustion gases of an upcoming combustion event, commonly known as internal EGR. The latter is often achieved by valve timing adjustments. Typically exhaust gases are routed from an exhaust duct to an intake duct via a control valve (EGR valve). The present invention provides for an alternative configuration for EGR in which gases exhausted from the SI cylinder bank 12 are routed to the intake of the HCCI cylinder bank 14 via valve 39. In FIG. 1, the exhaust gases are collected downstream of exhaust gas aftertreatment device 20. This is shown by way of example and not intended to be limiting. The exhaust gases can be taken from any position in the exhaust duct. There are two advantages for circulating exhaust gases from the SI bank 12 to the HCCI bank 14. Typically, SI combustion occurs with a stoichiometric mixture, which provides combustion gases containing primarily $CO_2$, $H_2O$, and $N_2$. In contrast, HCCI cylinders combust lean mixtures which have excess air. Thus, HCCI exhaust gas has significant levels of $O_2$ and more $N_2$ than a SI exhaust gas. To obtain a desired diluent fraction, a greater amount of HCCI exhaust gas is recycled compared with the SI exhaust gas quantity. It is well known to those skilled in the art that to achieve ignition in HCCI, it is common to heat the intake air. Because the exhaust gas temperature is higher with SI combustion, less intake heating is required when the EGR employed comes from SI combusting cylinders. In particular, with reference to FIG. 1, gas from the exhaust duct coupled to cylinder bank 12 is drawn through EGR system 39 and supplied to the intake of cylinder bank 14 via a control valve.

Continuing with FIG. 1, each cylinder bank is provided with an exhaust gas aftertreatment device, 20 and 22. In one embodiment, device 20 is a three-way catalyst, which efficiently oxidizes CO and hydrocarbons and reduces nitrogen oxides (NOx) when provided a stoichiometric exhaust gas. As mentioned above, obtaining higher fuel efficiency motivates HCCI development. Another advantage of HCCI combustion, which occurs in a very lean or dilute mixture, is that it produces very low levels of NOx, particularly compared to SI operation. In one embodiment, the HCCI cylinders require no NOx aftertreatment and aftertreatment device 22 is an oxidation catalyst to process unburned fuel and CO. In another embodiment, a lean NOx aftertreatment device is employed to process the low levels of NOx when very low NOx levels are required or when HCCI operation is extended into regions at which the NOx produced is somewhat higher than typical HCCI combustion. In this embodiment, the lean NOx aftertreatment device is either a lean NOx trap or a lean NOx catalyst. A lean NOx trap stores NOx during lean operation. When the trap is no longer able to store additional NOx, the trap is purged by operating lean for a period of time. During the lean operation, the NOx is desorbed from the trap and reacted to $N_2$ and $O_2$. To accomplish a rich excursion with HCCI, one alternative is to operate with a very high level of EGR to displace excess air. A lean NOx catalyst processes NOx in the presence of a reductant, either fuel or urea.

In FIG. 1, an indication of exhaust gas constituents is provided by an exhaust gas sensor, 60 and 62, situated in the exhaust ducts exiting each cylinder bank. Only a single sensor is shown in FIG. 1. Exhaust gas sensor 60 is an oxygen sensor, either heated or unheated, which provides an indication of whether the exhaust gas is near stoichiometry. In another embodiment, sensor 60 is a wide-range oxygen sensor provides a measure of exhaust gas stoichiometry. Exhaust gas sensor 62 measures NOx concentration. Alternatively, sensor 62 is a wide-range oxygen sensor. Only one exhaust gas sensor is shown in each of the exhaust ducts of engine 10. However, it is known to use multiple exhaust gas sensors. In one embodiment, both a wide-range oxygen sensor and a NOx sensor are placed in place of sensor 62. Furthermore, it is common practice to provide a sensor both upstream and downstream of an exhaust aftertreatment device. The inventors of the present invention contemplate any known exhaust gas sensor type in any location in the exhaust ducts.

The signal from an exhaust gas oxygen sensor 60 is commonly used for air-fuel ratio feedback control of SI combustion. Analogously, HCCI combustion timing is controlled by adjusting intake temperature, according to one alternative embodiment. Adjustment of intake temperature is feedback controlled based on a combustion parameter such as crank angle of peak pressure. Examples of sensors from which crank angle of peak pressure can be ascertained include: head bolt strain gauge, in-cylinder pressure sensor, ionization sensor, a head gasket sensor, sensor measuring instantaneous flywheel speed, etc. For stoichiometric SI combustion, it is well known by those skilled in the art that the crank angle of peak pressure corresponding to peak efficiency operation (at a given speed/torque condition) occurs roughly at 15 degrees after top dead center. Alternative combustion systems, particular lean burn, tend to have the crank angle of peak pressure occur at a somewhat earlier time, e.g., 12 degrees after top dead center to achieve peak efficiency. Furthermore, there are other objectives, besides achieving peak efficiency, such as emission control, which cause the desired crank angle of peak pressure to be other than that providing peak efficiency. It is expected that a desired crank angle of peak pressure is in a range of 5 to 20 degrees after top center. Various combustion control parameters, such as: intake temperature, EGR valve position, throttle valve position, flow through an intake heat exchanger, and pressure charging, can be feedback controlled based on crank angle of peak pressure, particularly for the HCCI cylinders.

Because HCCI combustion is dilute, the peak torque capable from a given cylinder is much less than peak torque from a SI cylinder. To increase the amount of torque from a HCCI cylinder, compressor 34 increases the intake manifold pressure on the HCCI cylinders, allowing for an increased amount of fuel delivery while maintaining a high dilution. As shown in FIG. 1, compressor 34 is connected by a shaft to turbine 32, a device known as a turbocharger. The unconventional ducting of FIG. 1 has turbine 32 extracting work from SI cylinder exhaust gases which compress intake gases of HCCI cylinders via compressor 34. HCCI combustion is known to provide superior fuel efficiency to SI combustion. Thus, HCCI exhaust gases have a lower enthalpy than SI exhaust gases because HCCI allows more of the energy release of combustion to be extracted. Thus, it is desirable to extract the SI exhaust gas energy to pressure charge the HCCI inlet. In another embodiment, exhaust turbine 32 is coupled to the HCCI exhaust duct. The turbocharger of FIG. 1 is a variable geometry turbocharger. In yet another embodiment, a supercharger is provided in place of turbocharger (comprising elements 32, 34, and 36). A supercharger is a compressor, like compressor 34 of FIG. 1, which is driven by engine 10. A supercharger is not coupled to a turbine.

In FIG. 1, an intake gas heat exchanger 38 is contained with the exhaust duct coupled to the SI cylinders. It is known in the art that one of the methods to control ignition timing of HCCI combustion is by controlling the intake temperature. Diverter valve 37 allows adjustment of the quantity of HCCI intake gases passing through heat exchanger 38 and the quantity passing through bypass duct 35, thereby providing control of HCCI intake temperature.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are commands to fuel injectors 26 and 28 such as fuel injection timing, fuel injection rate, and fuel injection duration. Additional parameters under CPU 46 control are position of throttle valves 24, timing of spark plug 58, position of control EGR valves 39, other control valves 37, variable geometry turbocharger nozzle position, intake and exhaust valve timing, and others. Sensors 42 communicating input through I/O interface 44 may include piston position, engine rotational speed, vehicle speed, coolant temperature, intake manifold pressure, accelerator pedal position, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 2A:
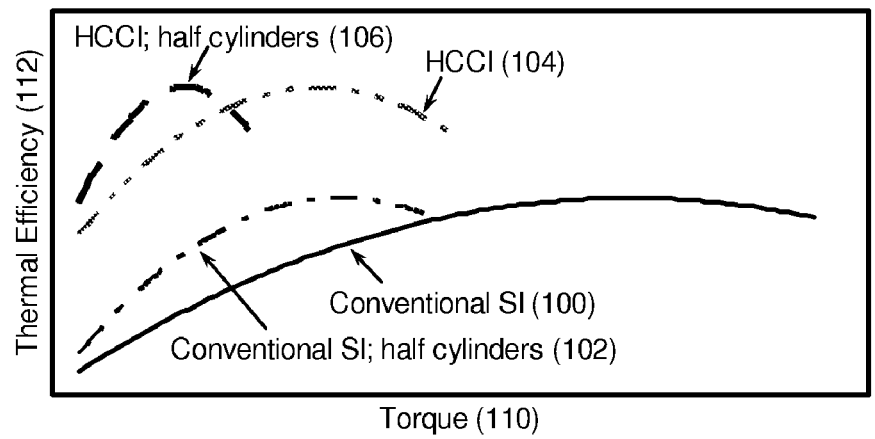
FIGS. 2a-2c are graphs of torque vs. fuel efficiency for prior art SI and HCCI engines and an engine according to an aspect of the present invention.

Referring to FIG. 2a, a graph of thermal efficiency as a function of torque is shown for a conventional SI engine as curve 100. Curve 104 indicates the higher thermal efficiency that is possible when operating the same displacement engine in the HCCI combustion mode. The thermal efficiency is markedly improved. However, HCCI does not provide the same range in torque as a SI engine of the same displacement. To provide the same torque level, either the displacement of the engine has to be roughly doubled or combustion mode is changed from HCCI at low torque and then SI when higher torque is demanded.

Also shown in FIG. 2a are curves 102 and 106, which is only half of the engine cylinders operating on SI and HCCI respectively. The peak thermal efficiency is the same as the corresponding curves 100 and 104 when the engine is operated with all cylinders on SI and HCCI, respectively. The range in torque, is half that of the running the whole engine.

Figure 2B:
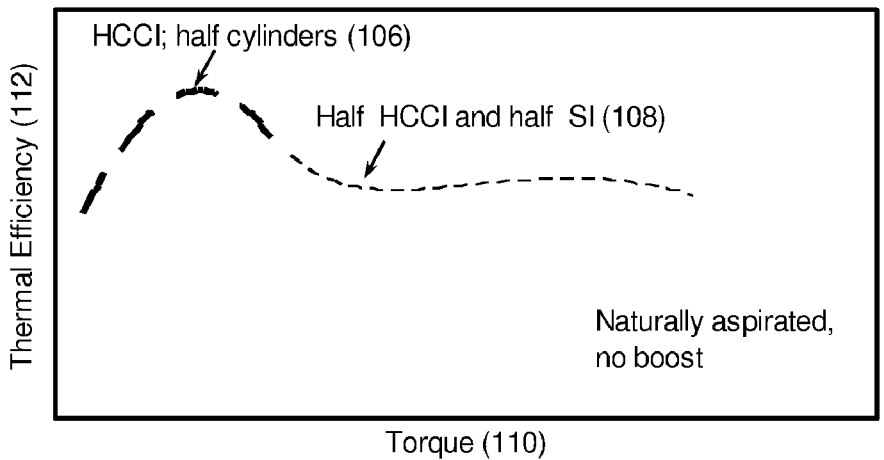

According to an aspect of the present invention, half of the cylinders are operated with HCCI combustion and half of the cylinders are operated with SI combustion, the effect of such operation on torque and thermal efficiency being shown in FIG. 2b. Note that FIG. 2b relates to a naturally aspirated engine in which there is no supercharger or turbocharger to pressurize intake gases. Because of the high efficiency of HCCI combustion, it is desirable to operate only the HCCI cylinders at low torque demands. Thus, curve 106 of FIGS. 2a and 2b are identical, i.e., half of the cylinders operating on HCCI and the other cylinders being deactivated. When a higher demand in torque is desired, SI cylinders are activated and torque is being provided by both the SI and HCCI cylinders, shown as curve 108 in FIG. 2b. Because HCCI cylinders cannot provide the same torque range as SI, the peak torque in FIG. 2b is less than what is shown in FIG. 2a. The efficiency shown in FIG. 2b exceeds that of the SI engine efficiency, curve 102, of FIG. 2a at all values of torque.

Figure 2C:
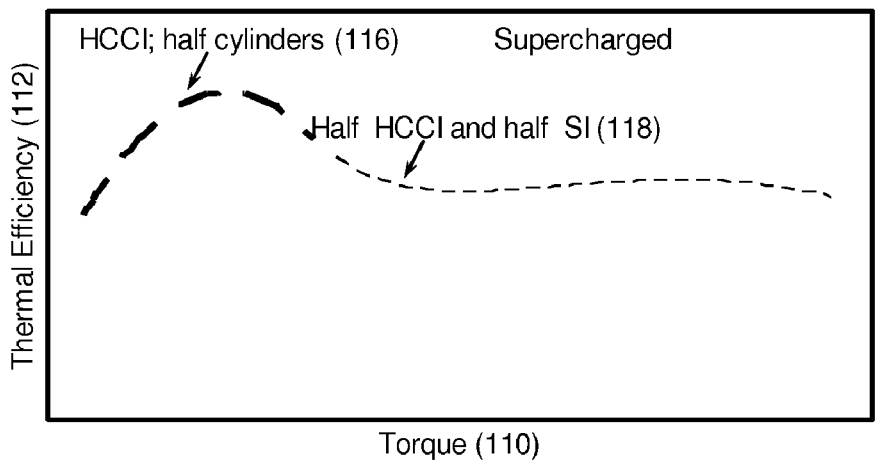

To make up for the lesser torque of the engine illustrated in FIG. 2b, either the displacement of the engine can be increased or boosting applied. Boosting can be applied to the HCCI cylinders or all engine cylinders. However, as discussed above, since HCCI provides less torque, an approach for HCCI cylinders to match torque is to boost only HCCI cylinders. Curve 116 of FIG. 2c shows thermal efficiency where boost is provided by a supercharger. The torque range of curve 116 is wider than that of curve 106 (of FIG. 2b) due to the increased amount of air delivered to the HCCI cylinders by the supercharger. The torque level at which half HCCI and half SI (curve 118 of FIG. 2c) is invoked it higher than in FIG. 2b. The maximum torque in FIG. 2c is about that of FIG. 2a.

If a turbocharger were employed in place of a supercharger, no increase in torque range with HCCI only operation is possible because the SI cylinders are deactivated, thus no exhaust to drive the turbocharger.

Because achieving a sufficiently high temperature to cause autoignition is paramount in HCCI combustion, providing a robust cold start presents a serious hurdle for HCCI combustion. Those skilled in the art discuss starting on SI combustion and transitioning to HCCI combustion after the engine has achieved a suitable operating temperature. However, with the present invention, the cylinders are adapted to operate in only one combustion mode. To overcome, the inventors of the present invention contemplate starting on SI cylinders. During the period of SI combustion, air can be delivered to HCCI cylinders through heat exchanger 38. By blowing warm air through the HCCI cylinder bank 14, the engine surfaces can be preheated and ready for HCCI combustion. In addition, the engine coolant is heated by the SI cylinders and preheats the HCCI cylinders.

According to an aspect of the present invention, the SI cylinders are equipped with valve deactivators (not shown). During HCCI only operation, the SI cylinders are deactivated by closing off the intake and exhaust valves. The piston continues to reciprocate, but the gas in the cylinder at the last combustion event remains trapped in the cylinder. If the valves were allowed to remain active, the flow of air through SI cylinder bank 12 would flow into exhaust aftertreatment device 20. If device 20 is a three-way catalyst, oxygen would be absorbed onto the surfaces and when the SI cylinders were reactivated, the three-way catalyst would be unable to reduce NOx until such oxygen is removed from device 20. Furthermore, the flow of air through SI cylinder bank 20 cools the engine down, thereby making restart more difficult.

In one embodiment, valve deactivators are provided for the HCCI cylinders (not shown in FIG. 1). However, because HCCI combustion is more efficient than SI combustion, it is desirable to operate the HCCI cylinders whenever possible. When the HCCI cylinders have not attained a suitable operating temperature, the HCCI cylinders can be deactivated. However, according to an aspect of the invention discussed above, exhaust waste energy from SI cylinders is transferred to HCCI induction air via heat exchanger 38. Thus, it may be preferable to allow valves in HCCI cylinders to operate as normal to allow heating.

Referring to FIG. 3, a cold start is initiated in block 150. The engine starts operation on SI cylinders only, block 152. Induction air flows through heat exchanger 38 and then through HCCI cylinders to warm up the HCCI cylinders, block 154. In block 156, it is determined whether a sufficient temperature has been achieved. If so, operation in the HCCI cylinders is initiated in block 158. If the torque that can be produced by the HCCI cylinders is sufficient to meet torque demand (determined in block 160), control is passed to block 162 in which the SI cylinders are deactivated. If not enough torque can be produced in the HCCI cylinders, the engine is operated with all cylinders active, block 164.

Figure 4A:
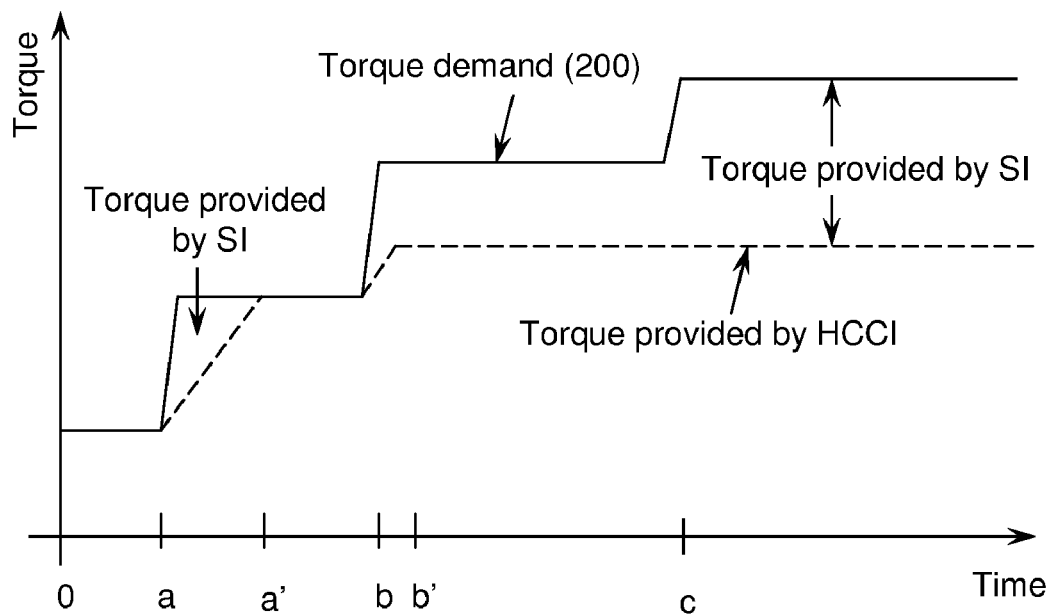
FIGS. 4a and 4b are graphs of driver demanded torque over time for an engine according to the present invention.

In FIG. 4a, a hypothetical driver torque demand as a function of time is shown as line 200. Between time o and time a, the driver demands a relatively low torque, at time a, the driver pushes down the accelerator pedal, which indicates demand for higher torque. The driver again demands increased torque at times b and c. Between times o and a, only the HCCI cylinders are active. Since the HCCI combustion mode provides superior fuel economy and the HCCI cylinders are capable of providing the desired torque, the SI cylinders are deactivated. As the torque demand isn't changing, there is no concern about the slow transient response of HCCI combustion. When the transition to a higher torque is demanded at time a, the HCCI cylinders cannot respond quickly enough to attain the new, higher torque. At time a', the HCCI cylinders have attained the desired torque level. However, between time a and a', if only HCCI cylinders were active, the torque response of the vehicle would be unacceptable to the operator of the vehicle. Thus, according to the present invention, the SI cylinders are activated at time a so that the operator demanded torque can be more closely followed than with HCCI cylinders alone. As the HCCI cylinders ramp up their torque production, the SI cylinders are ramped down and eventually deactivated at time a'. At time b, another rapid torque increase is demanded. Again, the SI cylinders are activated to fill in and the torque produced by the HCCI cylinders is ramped up. As at time a when a rapid torque increase is demanded, the HCCI cylinders are too slow to provide the transient response requested. Thus, the SI cylinders are reactivated at time b. At time b', the HCCI engines have attained their maximum torque output condition. Thus at time b', the SI cylinders remain active. At time c, the further increase in demanded torque is provided solely by the SI cylinders because the HCCI cylinders are already operating at their peak capacity.

Figure 4B:
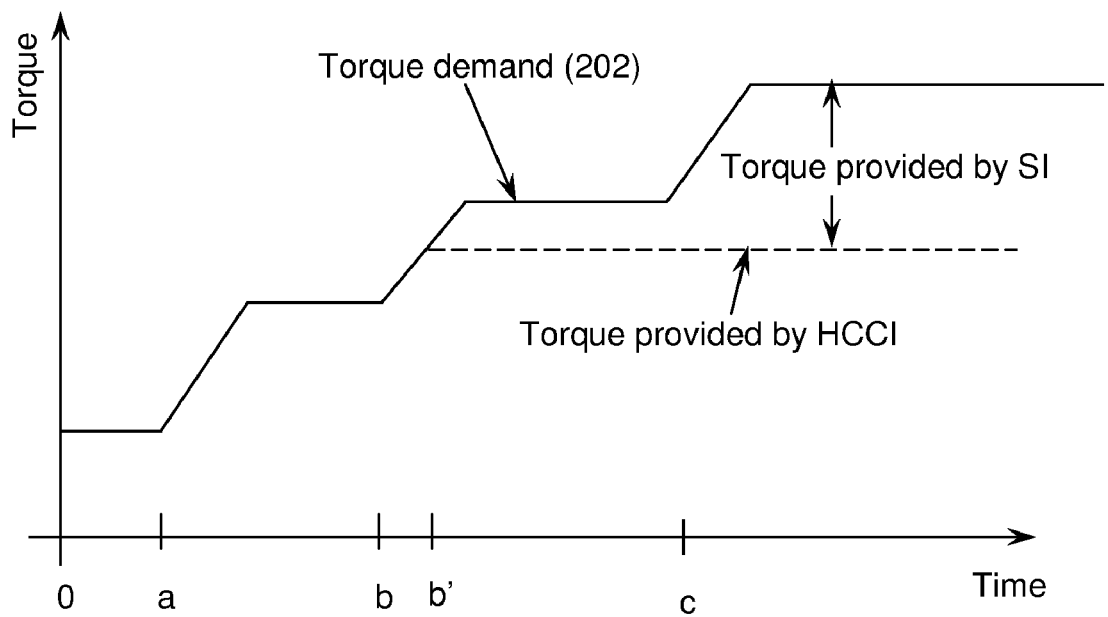

In FIG. 4b, a similar increase in torque is shown, however with a much slower demand for transient torque response. From time o to time b', the driver demand is slow enough that the HCCI cylinders can provide the desired torque demand. At time b', the HCCI cylinders have reached their capacity and the SI cylinders are activated. Further increases in torque are provided by the SI cylinders.

In another embodiment, the SI cylinders remain active at all times. In one example of this embodiment, an 8-cylinder is started on 2 SI cylinders. The remaining 6 cylinders are HCCI cylinders, which are turned on when they reach a suitable temperature which supports robust HCCI combustion. In this embodiment, the SI cylinders remain operational even after HCCI combustion has been achieved in the 6 HCCI cylinders.

Figure 5:
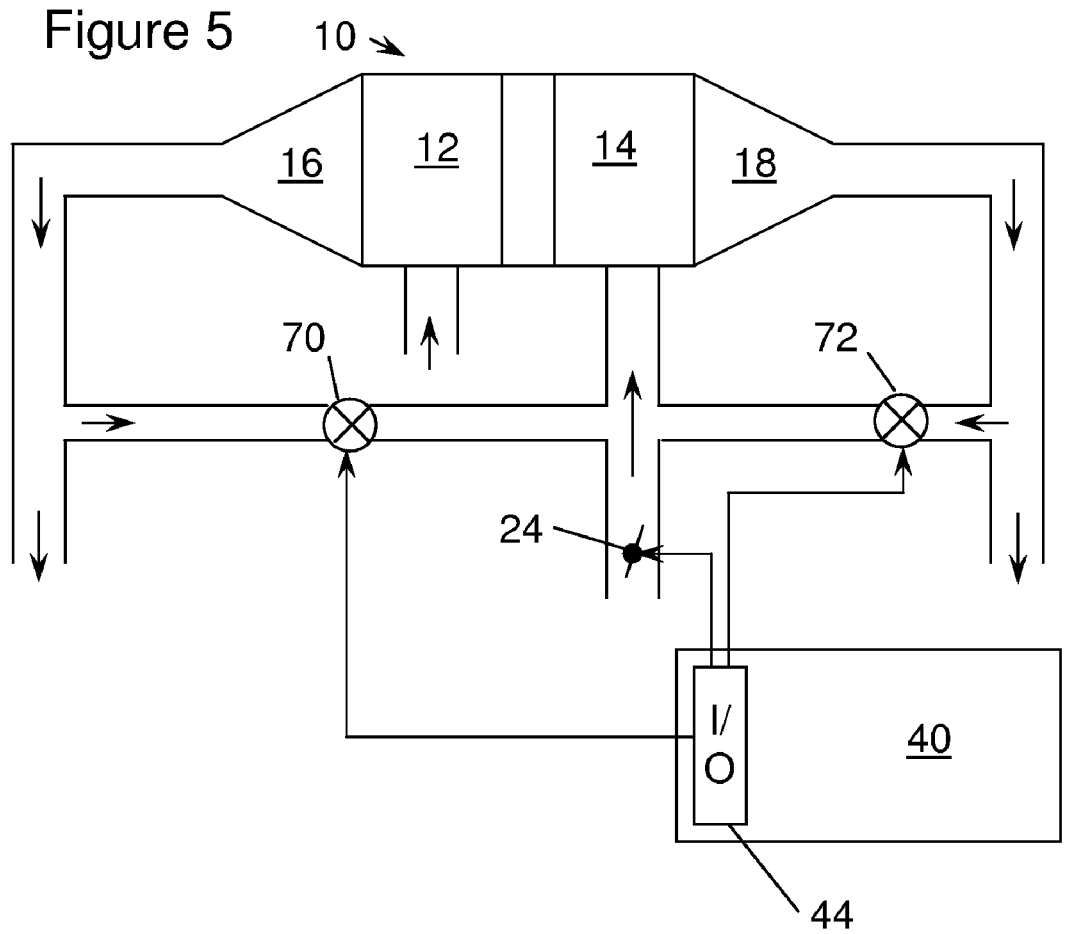
FIG. 5 is a schematic of the exhaust gas recirculation according to an aspect of the present invention.

Referring now to FIG. 5, a HCCI bank 14 and a SI bank 12 are incorporated in engine 10. The arrangement of FIG. 5 is provided simply for ease of illustration. As discussed above, various arrangements are contemplated by the inventors of the present invention, in one example each bank has one HCCI cylinder and three SI cylinders with complicated manifolding to keep their intake and exhaust gases separated.) Bank 12 is provided with exhaust 16 and bank 14 is provided with exhaust 18. A portion of exhaust gases from bank 12 may be drawn off by an EGR system through EGR valve 70. Similarly, exhaust gases are drawn from an exhaust from bank 14 through EGR valve 72. Both EGR ducts flow into the intake to bank 14. The intake to bank 14 is also supplied with throttle valve 24. Throttle valve 24, EGR valve 70 and EGR valve 72 are controlled by electronic control unit 40.

Because HCCI combustion is very dilute, HCCI combustion gases are at a much lower temperature than SI combustion gases. By controlling the proportion of EGR gases coming from bank 12 and from bank 14, the temperature in HCCI cylinders is controlled. As mentioned above, one of the ways, known by those skilled in the art, for controlling HCCI combustion timing is by adjusting the temperature of the gases in the HCCI cylinder. By continuing to operate SI cylinders while HCCI cylinders are operating, the exhaust gases from SI cylinders is available for recycle to the HCCI cylinders for controlling temperature in HCCI cylinders.

While several modes for carrying out the invention have been described in detail, those familiar with the art to which this invention relates will recognize alternative designs and embodiments for practicing the invention. The above-described described embodiments are intended to be illustrative of the invention, which may be modified within the scope of the following claims.

We claim:
1. An internal combustion engine, comprising:
   a first portion of engine cylinders;
   a second portion of engine cylinders;
   a first exhaust gas recirculation duct adapted to provide flow from an exhaust of said first portion of engine cylinders to an intake of said first portion of engine cylinders;
   a first exhaust gas recirculation valve disposed in said first exhaust gas recirculation duct;
   a second exhaust gas recirculation duct adapted to provide flow from an exhaust of said second portion of engine cylinders to an intake of said first portion of engine cylinders via a first exhaust gas recirculation valve; and
   a second exhaust gas recirculation valve disposed in said second exhaust gas recirculation duct.
2. The engine of claim 1 wherein a compression ratio of said first portion of engine cylinders is at least two ratios higher than said second portion of engine cylinders.
3. The engine of claim 1, further comprising: an electronic control unit coupled to said first and second portions of engine cylinders and said first and second exhaust gas recirculation valves, said electronic control unit commanding a first position to said first exhaust gas recirculation valve and a second position to said second exhaust gas recirculation valve based on a desired intake temperature in the said first portion of engine cylinders.
4. The engine of claim 1 wherein said first portion of engine cylinders and said second portion of engine cylinders are mutually exclusive.
5. The engine of claim 1 wherein said exhaust of said first portion of engine cylinders is separated from an exhaust of said second portion of engine cylinders.
6. The engine of claim 1 wherein said intake of said first portion of engine cylinders is separated from an intake of said second portion of engine cylinders.
7. The engine of claim 1 wherein said first portion of engine cylinders is greater than said second portion of engine cylinders.
8. The engine of claim 7 wherein said first portion of engine cylinders comprise all but one cylinder on each bank of cylinders of the engine.
9. A method for controlling an internal combustion engine, comprising:
   adjusting a valve position of a crossover exhaust gas recirculation valve, said crossover exhaust gas recirculation valve being disposed in an exhaust gas recirculation duct between an intake of a first portion of engine cylinders and an exhaust of a second portion of engine cylinders wherein said first and second portions are mutually exclusive, gases passing through said exhaust gas recirculation valve are provided exclusively from said exhaust of said second portion of engine cylinders, and said gases are provided exclusively to said first portion of engine cylinders.

10. The method of claim 9 wherein said adjustment is based on a desired intake temperature of gases provided to said first portion of engine cylinders.

11. The method of claim 9, further comprising: adjusting a valve position of a second exhaust gas recirculation valve, said second exhaust gas recirculation valve being disposed in an exhaust gas recirculation duct between an exhaust of said first portion of engine cylinders and said intake of said first portion of engine cylinders.

12. The method of claim 9 wherein said valve is adjusted to a fully open position during starting of the engine.

13. The method of claim 9 wherein said exhaust gas recirculation duct is coupled to said exhaust of said second portion of engine cylinders downstream of an exhaust aftertreatment device coupled to said exhaust of said second portion of engine cylinders.

14. A computer readable storage medium having stored data representing instructions executable by a computer, comprising: instructions to adjust a valve position of a crossover exhaust gas recirculation valve, said crossover exhaust gas recirculation valve being disposed in an exhaust gas recirculation duct between an intake of a first portion of engine cylinders and an exhaust of a second portion of engine cylinders wherein said first and second portions are mutually exclusive wherein intakes of said first and second portions of engine cylinders are separated and exhausts of said first and second portions of engine cylinders are separated.

15. The medium of claim 14, further comprising: instructions to determine a desired intake temperature for said first portion of engine cylinders wherein said adjustment of said crossover exhaust gas recirculation valve is based on providing said desired intake temperature.

16. The medium of claim 15, further comprising: instructions to adjust a valve position of a second exhaust gas recirculation valve, said second exhaust gas recirculation valve being disposed in an exhaust gas recirculation duct between an exhaust of said first portion of engine cylinders and said intake of said first portion of engine cylinders.

17. The medium of claim 14, further comprising: instructions to fully open said crossover exhaust gas recirculation valve during starting of said engine.

18. The medium of claim 17, further comprising: instructions to provide fuel to said second portion of engine cylinders and to provide no fuel to said first portion of engine cylinders during said starting.

19. The medium of claim 17 wherein said first portion of engine cylinders comprise all, less one, engine cylinders in each bank of the engine.

20. The medium of claim 14, further comprising: instructions to determine crank angle of peak pressure for said first portion of engine cylinders wherein said adjustment of said crossover exhaust gas recirculation valve is based on providing a desired crank angle of peak pressure.

21. The medium of claim 20 wherein said desired crank angle of peak pressure occurs between 5 and 20 degrees after top center.

* * * * *